Figure 1:
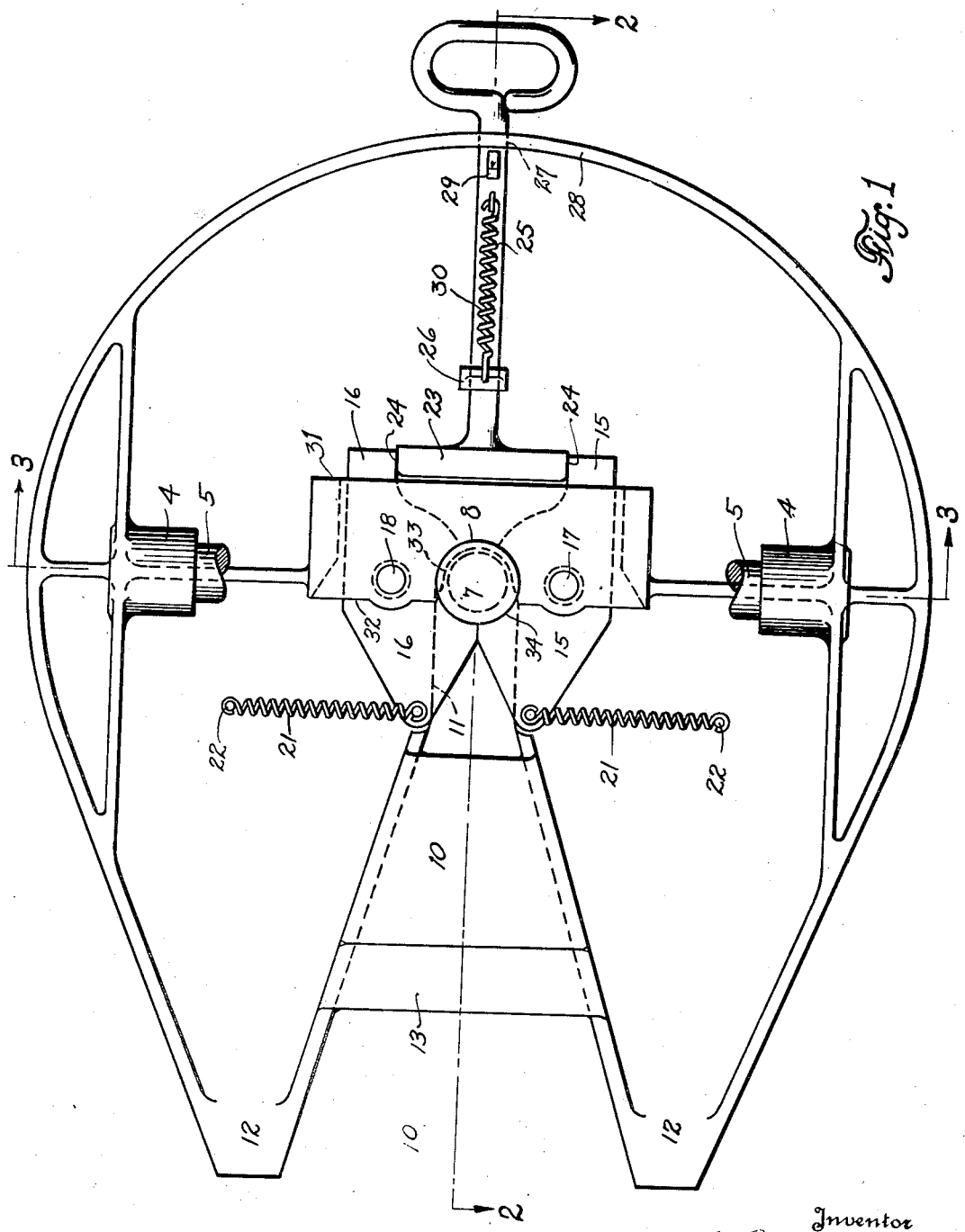

Feb. 13, 1934.　　　F. I. ROGERS　　　1,946,987
FIFTH WHEEL
Filed June 6, 1932　　　2 Sheets-Sheet 1

Francis I. Rogers, Inventor

By Soule & Leonard,
Attorneys

Feb. 13, 1934.  F. I. ROGERS  1,946,987
FIFTH WHEEL
Filed June 6, 1932  2 Sheets-Sheet 2
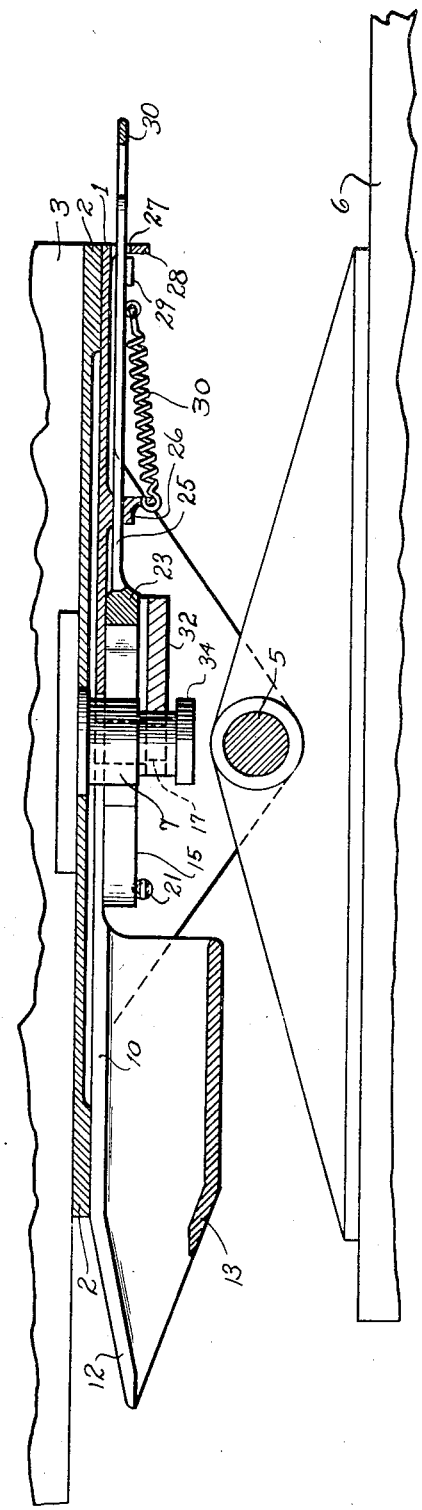
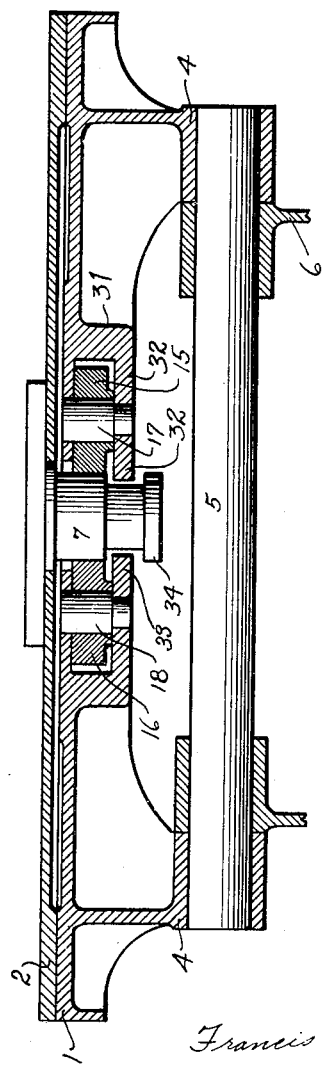
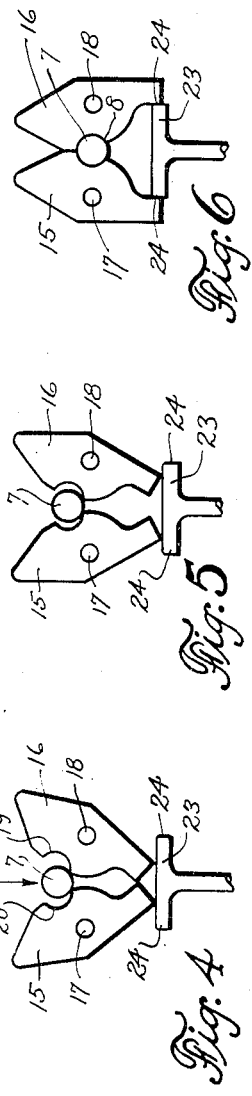
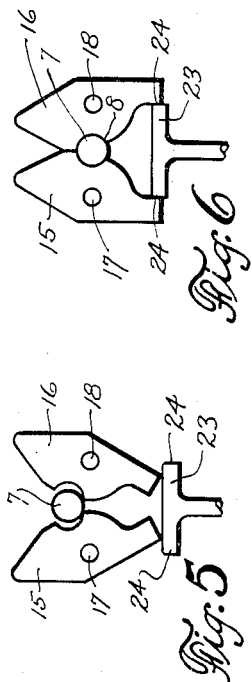
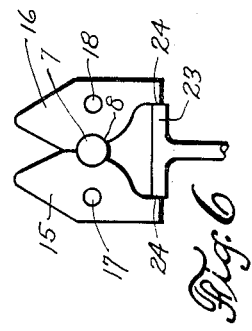

Patented Feb. 13, 1934

1,946,987

UNITED STATES PATENT OFFICE 1,946,987

FIFTH WHEEL

Francis I. Rogers, Albion, Pa., assignor to Rogers Brothers Corporation, Albion, Pa., a corporation of Pennsylvania Application June 6, 1932. Serial No. 615,569

6 Claims. (Cl. 280—33.1)

This invention relates to fifth wheels and particularly to a new and improved device for locking the king pin in operating position.

In the fifth wheels of the type in which a pair of locking jaws on one bearing member are adapted to grasp a king pin on the complementary bearing member for pivotally connecting the bearing members together, the jaws are so pivoted that they are subjected to undue stresses. Further, difficulty has been encountered providing suitable jaws mounted so as to grasp and contact with a large circumferential area of the pin.

An important feature of the present invention resides in the provision of jaws mounted in a manner such that the stresses to which the jaws are subjected are greatly reduced.

An equally important feature is to effect a rolling engagement of the pin contacting surfaces of the jaws with the pin as the pin is moved into connecting position.

Another object of the present invention is to reduce the lateral and longitudinal thrusts on the closure jaws due to "jackknifing" of the trailer and tractor vehicles.

Another object of the present invention is to provide a more effective fifth wheel construction which is light and durable and has a small number of moving elements.

Other objects and advantages of this invention will become apparent from the following description in which reference is made to the accompanying drawings, wherein is illustrated a preferred form of the invention.

In the drawings, Fig. 1 is a plan view of a fifth wheel embodying the principles of my invention, parts thereof being shown in section for purposes of clearness;

Figs. 2 and 3 are sectional views of the fifth wheel, taken on planes indicated by the lines 2—2 and 3—3 respectively of Fig. 1, and Figs. 4 to 6 inclusive are diagrammatic illustrations of progressive steps of operation of the locking jaws, showing the manner in which rolling engagement between the contacting surfaces of the jaws and pin is effected.

Referring to Figs. 1 and 2, the fifth wheel comprises complementary bearing plates 1 and 2, adapted to be connected, one to each of the vehicles of a tractor-trailer combination. For the purpose of illustration, the plate 2 is shown as secured to the underside of the trailer 3 in fixed position relative thereto. The plate 1 is provided with depending ribs which carry pads 4 adapted to receive a transversely extending rock shaft or pivot 5 for pivotally securing the plate 1 to the tractor 6. Carried by the trailer and preferably concentric with the plate 2, is a depending king pin 7, which may be circular in cross section and adapted to be received and secured in a complementary opening 8 in the plate 1 for pivotally securing the vehicles together.

Referring to Fig. 1, the opening 8 is preferably semi-circular, the semi-circular end wall 9 thereof being substantially the same radius as the king pin to be engaged.

In order to permit radial insertion of the king pin 7 into the opening 8, the plate 1 is provided with a radial passage 10 communicating with the opening 8. The walls 11 of the passage 10, adjacent to the opening 8, are preferably parallel and tangent to the opening at its diameter, the outer limits of the walls 11 being flared outwardly so as to more easily receive and guide the pin to seating position. The usual downwardly sloping skids 12 are provided on the plate 1 for ease in engaging the fifth wheel members.

A reinforcing bridge is formed on the plate 1 and spans the radial passage 10 for reinforcing the plate, the wall 13 of the bridge being positioned in spaced relation to the plane of the plate to permit passage of the pin past the bridge as the pin moves radially along the passage toward the central opening 8.

Pivotally mounted on the plate 1 are locking jaws 15 and 16, these jaws being mounted on upright pivots 17 and 18 respectively, and being adapted to swing about their respective pivots into pin-engaging position, as illustrated in Fig. 1. The jaws are oppositely recessed with recesses 19 and 20 respectively, the recesses being substantially the same radius as the king pin 7.

In order to draw and yieldably hold the jaws in relatively separated position so as to permit radial insertion of the pin into the opening 8, springs 21 are provided, these springs being secured at one end to the respective jaws and at the other end to suitable bosses 22 on the bearing plate 1.

When the jaws are rotated about the pivots by the springs 21 into the relatively separated position, the rearward ends of the walls of the recesses 19 and 20 project into the opening 8 in a position to be engaged by the pin as the pin is moved radially into said opening. As the pin continues to travel toward operating position in the opening 8, it rotates the jaws about their respective pivots into pin-engaging position by contact with these ends of the recess walls.

In order to latch the jaws in the pin-engaging position, a latching block 23, movable radially toward and away from the jaws, is provided.

Shoulders 24 are formed on the rearwardly projecting ends of the jaws and are positioned to receive the latch block 23 snugly therebetween, when the jaws are rotated into pin-engaging position. The latch block 23 thus cooperates with said shoulders to prevent return of the locking jaws to releasing position. In order that the block 23 may be seated automatically consequent upon movement of the jaws to pin-engaging position by the pin, the block is mounted on a bar 25 which, in turn, is slidably mounted in a pad 26 on the plate 1. The bar extends radially from the block 23 through a passage 27 in the peripheral flange 28 of the plate 1. A lug 29 is secured on the bar 25 in a position to engage the outer wall of the flange 28 to latch the bar in a withdrawn position, the passage 27 being sufficiently larger in cross section than the bar to permit passage of the lug 29 therethrough. A spring 30 is secured at one end to the pad 26 and at the other end to the bar 25, the end of the spring engaging the pad being spaced considerably above the plane of the bar 25 so that the spring is inclined toward its point of connection with the bar. The spring is tensioned consequent upon drawing the bar outwardly from the jaws a sufficient distance to dispose the lug 29 outwardly of the flange 28 and due to the inclined position of the spring, it bends or lifts the bar away from the plane of the plate 1 sufficiently to dispose the lug 29 out of alignment with the passage 27, thus stressing the inwardly facing shoulder of the lug 29 into latching engagement with an outer wall portion of the flange 28. When the bar is moved to release the lug 29 from the flange 28, the spring urges the block 23 against the rearward ends of the jaws so that it will immediately seat between the shoulders 24 when the jaws are moved into pin-engaging position. A suitable handle is provided on the rod 25 for withdrawing the block 23 from between the shoulders to permit disengagement of the jaws and pin.

Referring to Fig. 2, it will be noted that the lug 29 is square-shouldered at both ends. Consequently, when the block 23 is in locking position, the spring 30 also holds the lug 29 out of alignment with the passage 27 so that the outwardly disposed shoulder of the lug engages the inner wall portion of the flange 28. This engagement prevents accidental outward radial movement of the bar 25 and necessitates release of the lug by the operator for withdrawing the block 23, thus providing for greater safety. In this manner, a simple and effective double-acting latch is provided.

In order to mount the pivots 17 and 18 more securely, a bridge 31 is provided on the plate 1, this bridge having a wall 32 spanning the jaws 15 and 16 in spaced relation above the plate 1 so as to receive the jaws therebetween. The pivots 17 and 18 are secured at one end in the plate 1 and at the other end into the wall 32 of the bridge 31.

The pin 7 is provided with a shoulder 34 which is adapted to overhang the outwardly disposed surface of the wall 32 of the bridge when the pin is seated in operating position in the opening 8 for preventing axial movement of the pin out from said opening. The contacting surface of the shoulder 34 may be so positioned as to be in slightly spaced relationship to the wall 32 when the bearing plates 1 and 2 are in bearing contact so as to permit slight axial movement. As illustrated in Fig. 2, the upper wall 32 of the bridge 31 overhangs the central opening 8 and is recessed, as indicated at 33, so as to permit seating of the pin with the shoulder 34 in overhanging relation to the wall 32.

In order to effect a rolling engagement of the contacting surfaces of the jaws 15 and 16 with the king pin 7, the axes of the pivots 17 and 18 are positioned forwardly of the end wall of the opening 8, preferably in a plane through the axis of said opening or through the axis of the pin when the latter is seated in the opening. However, very effective results can be obtained so long as the pivotal axes of the pivots 17 and 18 are positioned longitudinally of the path of travel of the pin within the limits defined by the pin when in operating position in the opening 8.

The pivotal axes of the pivots 17 and 18 are preferably positioned laterally from the opening a distance such that the recesses of said jaws are tangent to the parallel walls 11 of the radial passage when the pin is positioned so that its axis and the axes of the pivots lie in a common plane.

Referring now to Figs. 4, 5 and 6, it is obvious that with the pivotal axes of the pivots 17 and 18 forwardly of the rear wall of the opening, a greater length of contacting surfaces 19 and 20 of the jaws is disposed into the opening 8 when the jaws are relatively separated. Therefore, when the pin is moved radially into the opening toward the end wall, as indicated by the arrow 33, a direct lever action for rotating the jaws about the pivots is effected by engagement of the pin and the inwardly disposed walls of the jaw recesses. Consequently, the walls of the jaw recesses immediately start receding from opening 10, and as the pin continues moving radially, the walls of the recesses 19 and 20 are gradually rolled into contacting engagement with the pin, becoming concentric therewith when the axis of the pin and the pivots lie in the same plane.

It is pointed out that heretofore the pivots, such as the pivots 17 and 18, are disposed rearwardly of the pin receiving opening or the operating position of the pin and that when so positioned, this rolling engagement cannot be obtained. Instead the engagement of the pin which the inwardly disposed edges of the jaws would cam the jaws inwardly and swing them into abutting relation with the contact surface of the pin with a sloping effect, thus subjecting the jaws and pin to excessive pounding. Furthermore, the shoulders of the jaws engaged by the leading face of the pin tend to travel in the same direction as the pin at a greater speed than the pin, thus causing a heavy reactionary thrust on the pivots.

In operation of the present fifth wheel, the block 23 is withdrawn and latched so that the jaws are free to open and as the pin is backed out of the opening, the springs 21 draw the jaws relatively apart to the position shown in Fig. 4. The block 23 is then released and is urged by the spring against the jaws. Upon movement of the pin radially into the opening, the pin first engages the inwardly disposed end of the jaw recesses and as it moves forwardly, rotates the jaws about their respective pivots, gradually rolling the contacting surfaces of the recesses 19 and 20 into engagement with the pin. In this position, the pin has engaged the arcuate end wall of the opening 8 and the shoulders 24 are disposed sufficiently far apart so that the block 23 is forced between by the spring 30, thus locking the jaws in such position with the pin fully embraced. It is apparent that with such an arrangement of the jaws, lateral thrusts on the pin are directed against the parallel walls 11, thus relieving the jaws and pivots 17 and 18 from these thrusts. Furthermore, the faces, due to pulling of the trailer vehicle through the medium of the jaws and the king pin, tending to shear the pins 17 and 18 or to tear the jaws, act on substantially the same length lever arms about the pivots as do the reactionary forces on the shoulders 24, consequently the pins are subjected to far less stress than if such forces were balanced by reactionary forces exerted at the end of comparatively short lever arms, as would be the case where the pivots were disposed rearwardly of the opening 8 near the shoulders 24.

The direct thrust resulting from "jackknifing" of the tractor and trailer are directed directly against the arcuate end wall of the opening 8, thus relieving the jaws of any stress as a result of any such force.

It is apparent from the foregoing description that in the present fifth wheel, the pin may be effectively engaged about its entire circumference and direct or heavy thrusts on the locking jaws are eliminated, thus making it possible to use a much lighter construction than has been possible heretofore. Furthermore, by eliminating the sloping engagement of the jaws with each other or with the pin, the wear and deterioration of these parts and crystallization of the metal are greatly reduced.

Having thus described my invention, I claim:

1. In a tractor-trailer combination, complementary bearing members on the respective vehicles, a king pin on one vehicle, a bearing member on the other vehicle having a central opening and a radial passage communicating with said opening for guiding the pin radially thereinto when the vehicles are moved relatively together, a stationary bridge on said bearing member on the side opposite the bearing surface, said bridge having a top wall disposed in spaced relation to said member, a pair of jaws pivotally mounted on upright pivots between said member and bridge top wall, said jaws being movable about their respective pivots consequent upon moving the pin radially into the opening for blocking the radial passage and thereby locking the pin in said opening, means for latching the jaws in the last mentioned position, and means carried by the pin and overhanging said bridge top wall when the pin is locked in said central opening for securing said pin against axial movement out from said opening.

2. In a tractor-trailer combination, a fifth wheel connection, comprising complementary bearing members on the respective vehicles, a king pin on one of said vehicles, a pair of oppositely recessed jaws mounted on upright pivots on the other vehicle adapted to receive the pin and to embrace the pin within the recesses when the pin is moved radially therebetween, said jaws being mounted on vertical pivots and movable thereabout to an open position for passage of the pin radially therebetween, means engageable by the pin as the pin moves between said jaws for moving the jaws relatively together for snugly embracing the pin within said recesses, complementary spaced shoulders on said jaws, a radially movable locking block adapted to be moved radially between said shoulders when the jaws are in pin-engaging position for locking the jaws in said position, means to withdraw the block from between said shoulders to an idle position, a spring normally urging said locking block to active position between said shoulders, and means operable by the same spring for latching the block in said idle position while the jaws remain in pin-engaging position.

3. In a tractor-trailer combination, a fifth wheel connection comprising bearing plates on the respective vehicles, an upright king pin of substantially circular cross section on one vehicle, the bearing plate on the other vehicle having an opening adapted to receive the pin radially, said opening having a stationary arcuate abutment wall of substantially the same radius as the pin for snugly engaging the pin when the pin is in connecting position, a stationary bridge on the last mentioned plate, said bridge having a top wall in spaced relation to the plane of said plate, said top wall having an opening coaxial with the first mentioned opening and adapted to receive another portion of the pin radially, said bridge opening having a stationary arcuate abutment wall of substantially the same radius as the part of the pin engaged thereby for engaging the pin when in connecting position, a pair of jaws pivotally mounted on upright pivots on said last mentioned bearing plate intermediate the plate and top wall of the bridge, said jaws having arcuate pin contacting surfaces of substantially the same radius as the abutment wall of the plate opening, said jaws being movable about their respective pivots by the pin as the pin moves radially into connecting position and into contact with said abutment walls to dispose said pin contacting surfaces of the jaws in embracing contact with the pin, said surfaces and abutment wall of the plate opening forming a substantially circular opening, the walls of which snugly embrace said pin when in a connected position, and means for locking said jaws in pin engaging position.

4. In a tractor-trailer combination, a fifth wheel connection, comprising complementary bearing members on the respective vehicles, a king pin on one of said vehicles, a pair of oppositely recessed jaws mounted on upright pivots on the other vehicle adapted to receive the pin and to embrace the pin within the recesses when the pin is moved radially therebetween, said jaws being mounted on vertical pivots and movable thereabout to an open position for passage of the pin radially therebetween, means engageable by the pin as the pin moves between said jaws for moving the jaws relatively together for snugly embracing the pin within said recesses, complementary spaced shoulders on said jaws, a locking bar radially movable in a given plane and adapted to be moved radially in said plane to position between the shoulders when the jaws are in pin-engaging position, a spring connected at one end to said bar and having its other end fixed relative to the bearing plate on which the bar is mounted, said spring being disposed at an angle to the normal operating plane of the bar, whereby it urges the bar both radially and at an angle to its normal operating plane, and means for latching said bar in given radial position, said means being operable consequent upon movement of the bar out of its normal plane by said spring.

5. In a tractor-trailer combination, a fifth wheel connection, comprising bearing plates on the respective vehicles, an upright king pin on one vehicle, the bearing plate on the other vehicle having an opening adapted to receive the pin radially, said opening having a stationary abutment wall adapted to abut the pin when the pin is in connecting position, a stationary bridge on said last mentioned bearing plate having a top wall in spaced relation to the plane of said plate, said top wall having a stationary pin abutment wall adapted to abut another portion of the pin when the pin is in connecting position, a pair of jaws pivotally mounted on upright pivots on said last mentioned plate intermediate the bridge top wall and plate, said jaws being movable about their respective pivots by the pin as the pin moves radially into said openings and into abutting relationship with said abutment walls to dispose said jaws in embracing relation with the pin, and means for locking said jaws in the pin engaging position.

6. In a tractor-trailer combination, a fifth wheel connection, comprising complementary bearing members on the respective vehicles, a vertically disposed king pin on one of said vehicles a pair of jaws mounted on upright pivots on the other member, said jaws being oppositely recessed for receiving the pin radially therebetween, said pin moving said jaws about their respective pivots into pin-engaging position consequent upon radial movement of the pin therebetween, means movable radially toward and away from the pin for latching said jaws in pin-engaging position, a spring for moving said latching means to active position, and means operable by the same spring for latching said jaw latching means in active and idle positions selectively while the jaws are in pin-engaging position.

FRANCIS I. ROGERS.